(12) United States Patent
Ho et al.

(10) Patent No.: US 9,794,427 B2
(45) Date of Patent: Oct. 17, 2017

(54) TRANSMISSION OF FACSIMILES VIA INTERNET PROTOCOL OVER PUBLIC NETWORKS

(71) Applicant: Biscom Inc., Chelmsford, MA (US)

(72) Inventors: S. K. Ho, Carlisle, MA (US); G. William Agudelo, Arlington, VA (US)

(73) Assignee: BISCOM INC., Chelmsford, MA (US)

( * ) Notice: Subject to any disclaimer, the term of this patent is extended or adjusted under 35 U.S.C. 154(b) by 0 days.

(21) Appl. No.: 14/877,493

(22) Filed: Oct. 7, 2015

(65) Prior Publication Data

US 2016/0028903 A1 Jan. 28, 2016

Related U.S. Application Data

(63) Continuation of application No. 14/165,952, filed on Jan. 28, 2014, now abandoned.
(Continued)

(51) Int. Cl.
*H04N 1/32* (2006.01)
*H04N 1/00* (2006.01)
*H04N 1/327* (2006.01)

(52) U.S. Cl.
CPC ..... *H04N 1/00209* (2013.01); *H04N 1/32432* (2013.01); *H04N 1/32771* (2013.01);
(Continued)

(58) Field of Classification Search
CPC ........... H04N 1/32374; H04N 1/32379; H04N 1/32561; H04N 1/32776; H04N 1/333; H04N 1/33338; H04N 1/33369; H04N 1/4413; H04N 2201/0039; H04N 2201/3216; H04N 2201/3218; H04N 2201/3219; H04N 2201/3222; H04N 2201/3335; H04N 1/32702; H04N 1/32128; H04N 1/32368; H04N 1/324;
(Continued)

(56) References Cited

U.S. PATENT DOCUMENTS

2002/0150124 A1* 10/2002 Asano ................ H04L 51/14
370/474
2008/0144085 A1* 6/2008 Song ................ H04N 1/00214
358/1.15

(Continued)

*Primary Examiner* — Henok A Shiferaw
(74) *Attorney, Agent, or Firm* — Blueshift IP, LLC; Robert Plotkin (57) ABSTRACT

A computer system maps unique addresses to the conventional fax numbers of conventional fax devices (such as conventional fax machines and computing devices having conventional fax capabilities). A transmitting user who is connected to the Internet may send an IP fax to a receiving user who is also connected to the Internet by addressing the receiving user using the receiving user's unique address, even if the sending user and receiving user are not within the same local network. A server outside of the receiving user's local network mediates the transmission of the IP fax from the transmitting user to the receiving user. The server may select a preferred transmission method of the recipient (e.g., conventional fax, IP fax, email, or secure document delivery) and transmit the fax to the receiving user using that preferred transmission method. Transmitted faxes may be in color and/or contain high-definition content.

12 Claims, 7 Drawing Sheets

Related U.S. Application Data

(60) Provisional application No. 61/789,348, filed on Mar. 15, 2013.

(52) U.S. Cl.
CPC ............... *H04N 2201/0039* (2013.01); *H04N 2201/0093* (2013.01)

(58) Field of Classification Search
CPC ........... H04N 1/32416; H04N 1/32438; H04N 1/32609; H04N 1/32635; H04N 1/32651; H04N 1/32662; H04N 1/32678; H04N 1/32786; H04N 2201/0015; H04N 1/00209; H04N 1/32432; H04N 1/32771; H04M 3/53
See application file for complete search history.

(56) References Cited

U.S. PATENT DOCUMENTS

| | | | | |
|---|---|---|---|---|
| 2011/0235095 A1* | 9/2011 | Kudo | ................. | H04N 1/32614 358/1.15 |
| 2012/0057178 A1* | 3/2012 | Toscano | ............. | H04N 1/00206 358/1.13 |
| 2013/0293933 A1* | 11/2013 | Rebert | ............... | H04N 1/00973 358/407 |
| 2013/0346522 A1* | 12/2013 | Lennstrom | .............. | H04L 51/14 709/206 |

* cited by examiner

TRANSMISSION OF FACSIMILES VIA
INTERNET PROTOCOL OVER PUBLIC
NETWORKS

BACKGROUND

Computer fax systems have become widely adopted in business applications due to the ease with which fax documents can be sent and received from different systems and applications without the need for the sending or receiving user to perform file conversions, since a common file type (G3 Encoded Fax Image Format) is widely accepted as the file format for communication in the T.30 fax protocol. One problem that exists with fax transmissions, however, is that they have a relatively low resolution. In business workflow applications, which may use optical character recognition (OCR) or bar codes to assist in the automated processing of documents, the low resolution of received fax transmissions may result in a higher level of errors when trying to read and interpret the content of the received documents. Images sent as faxes, such as medical images, may be almost impossible to read on the receiving end, thereby making them unusable for diagnostic purposes.

Although one potential solution to this problem is to transmit faxes at higher resolutions, attempting to transmit such faxes over the public switched telephone network (PSTN) results in unacceptably long delivery times.

What is needed, therefore, are improved methods for sending fax transmissions at high resolution without incurring unacceptably long delivery times.

SUMMARY

A computer system maps unique addresses to the conventional fax numbers of conventional fax devices (such as conventional fax machines and computing devices having conventional fax capabilities). A transmitting user who is connected to the Internet may send an IP fax to a receiving user who is also connected to the Internet by addressing the receiving user using the receiving user's unique address, even if the sending user and receiving user are not within the same local network. A server outside of the receiving user's local network mediates the transmission of the IP fax from the transmitting user to the receiving user. The server may select a preferred transmission method of the recipient (e.g., conventional fax, IP fax, email, or secure document delivery) and transmit the fax to the receiving user using that preferred transmission method. Transmitted faxes may be in color and/or contain high-definition content.

For example, one embodiment of the present invention is directed to a method comprising: (A) receiving a request to transmit an electronic package from a device of a transmitting user to a device of a receiving user, wherein the request is addressed to an address accessible on a public network; (B) identifying an Internet Protocol (IP) fax number of the receiving user based on data in the request; and (C) transmitting the electronic package to the device of the receiving user via an IP fax protocol at the identified IP fax number.

Other features and advantages of various aspects and embodiments of the present invention will become apparent from the following description and from the claims.

DETAILED DESCRIPTION

Figure 1:
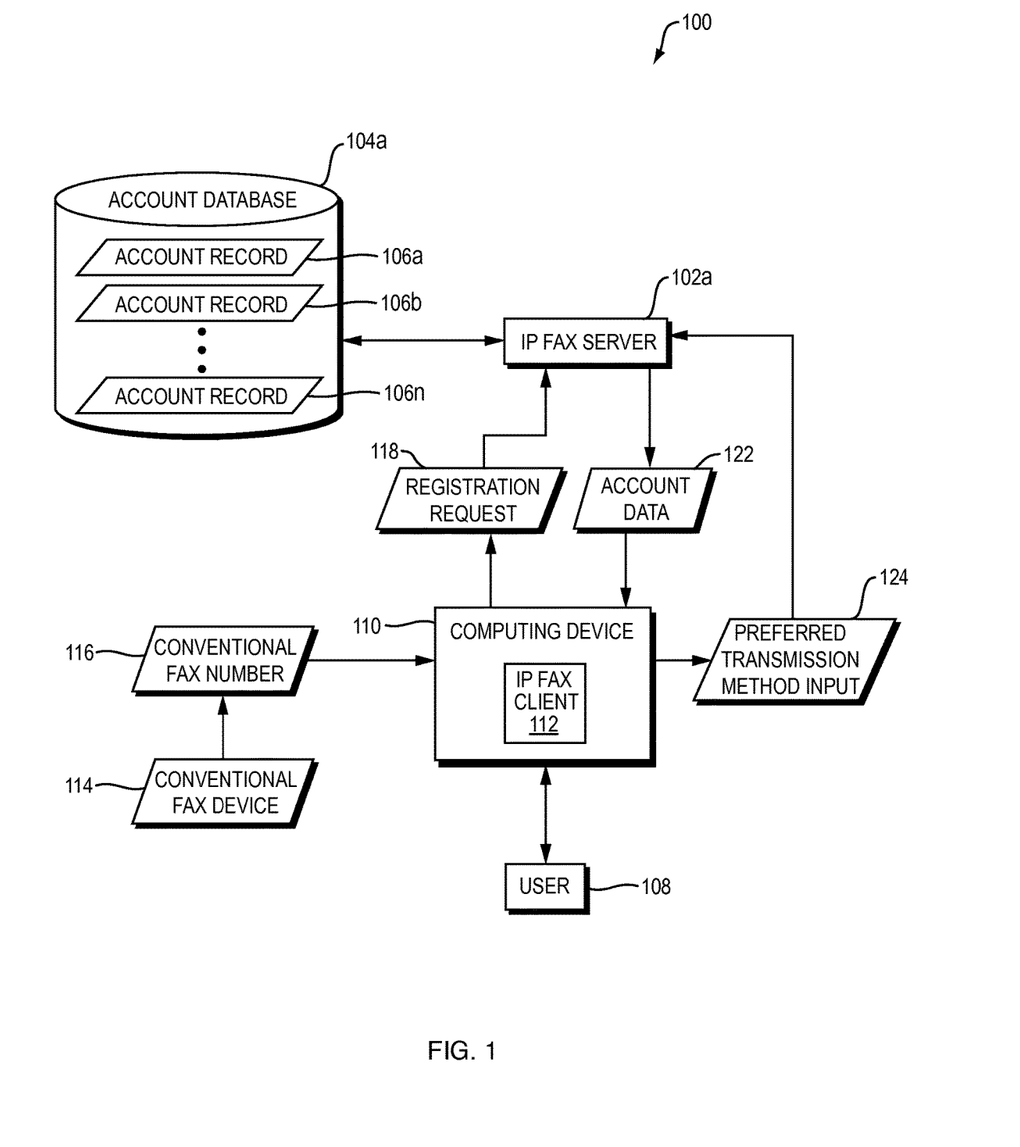
FIG. 1 is a dataflow diagram of a system for creating a registry that maps Internet Protocol (IP) fax numbers to conventional fax numbers according to one embodiment of the present invention.
Figure 2:
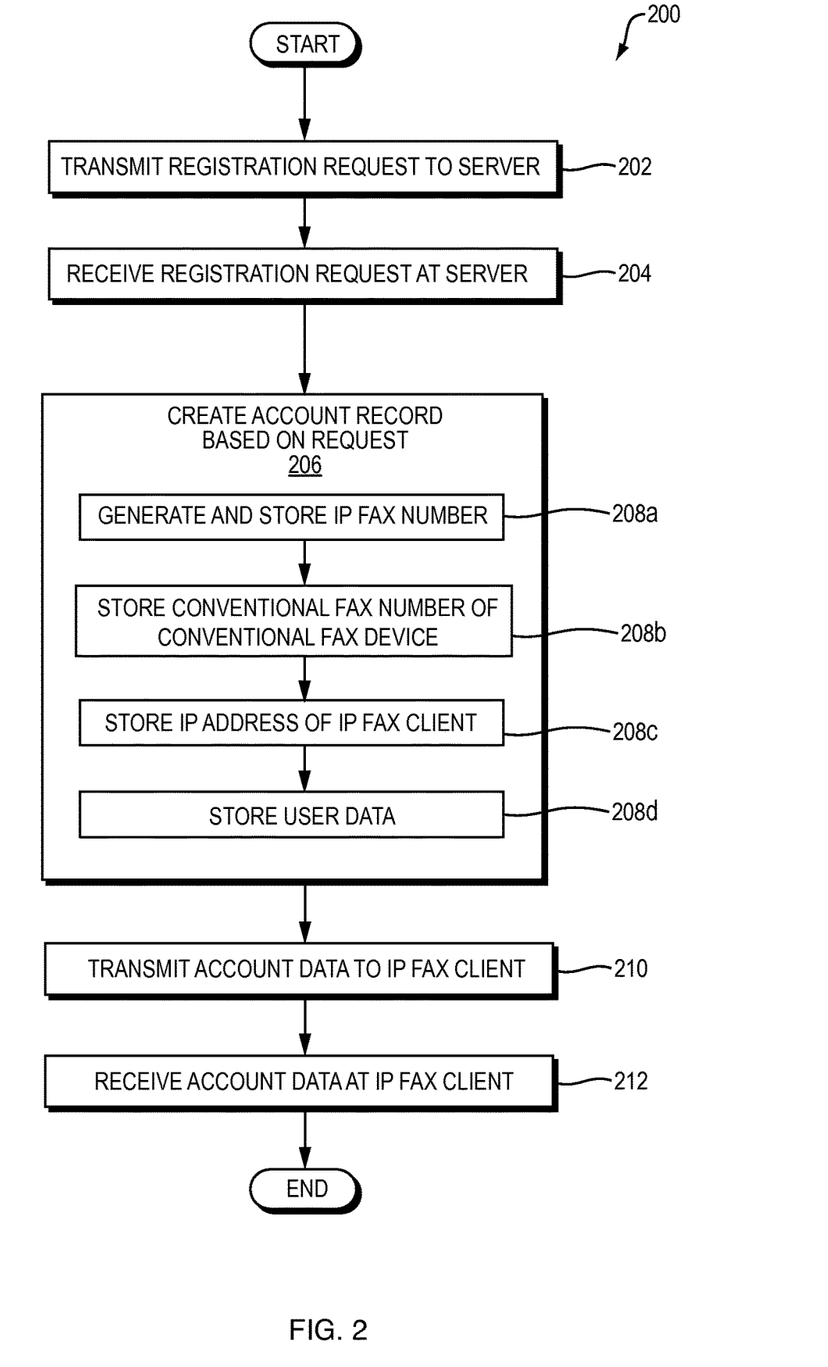
FIG. 2 is a flowchart of a method performed by the system of FIG. 1 according to one embodiment of the present invention.

Referring to FIG. 1, a dataflow diagram is shown of a system 100 for creating a registry that maps Internet Protocol (IP) fax numbers to conventional fax numbers for a plurality of accounts according to one embodiment of the present invention. Referring to FIG. 2, a flowchart is shown of a method 200 performed by the system 100 of FIG. 1 according to one embodiment of the present invention.

The system 100 includes an IP fax server 102*a*, which may perform a variety of functions within the system 100. For example, the IP fax server 102*a* may maintain a database 104*a* containing data representing a plurality of account records 106*a-n*, each of which represents a distinct user account. For example, and as will be described in more detail below, each of the account records 106*a-n* may represent an account associated with a unique IP fax number and may map that unique IP fax number to a conventional fax number.

Although the database 104*a* is described as a "database" herein, more generally the database 104*a* may be implemented as any data structure or collection of data structures. Furthermore, although only three particular accounts 106*a-n* are shown in FIG. 1 for ease of illustration, the database 104*a* may include any number of account records (i.e., n may be any number). The IP fax server 102*a* may read data from and write data to the account database 104*a* using any appropriate mechanism.

The IP fax server 102*a* may serve any number of users, each of whom may access the IP fax server 102*a* using any number of client devices. For ease of illustration, a single user 108, who accesses the IP fax server 102*a* using a single computing device 110, is shown in FIG. 1. The computing device 110 may include an IP fax client 112, which may, for example, be a software application that is installed on the computing device 110 and which is designed to communicate with the IP fax server 102*a* via an appropriate protocol.

The system 100 may also include any number of conventional fax devices. For ease of illustration, a single conventional fax device 114, used by the user 108, is shown in FIG. 1. Although not shown in FIG. 1, the fax device 114 may be connected to the Public Switched Telephone Network (PSTN), and may be assigned a unique telephone number, referred to herein as a "conventional fax number," within the PSTN. The term "conventional fax device" refers herein to any device which includes means for transmitting and/or receiving non-IP faxes (e.g., faxes transmitted using the T.30 fax protocol) over the PSTN. The term "conventional fax number" refers herein to an identifier that can be used to address a fax over the PSTN.

The conventional fax device 114 may be connected to the computing device 110, such as by a wired connection (e.g., a USB cable) or a wireless connection (e.g., a WiFi or BlueTooth connection). The user's computing device 110 may receive the conventional fax number 116 of the fax device 114 from the fax device 114. For example, the computing device 110 may transmit a request for the fax number 116 to the fax device 114, in response to which the fax device 114 may transmit the fax number 116 to the computing device 110. The computing device 110 may store the fax number 116 on any computer-readable medium. For example, the IP fax client 112 of the computing device 110 may receive the fax number 116 from the fax device 114 and store the fax number 116 on a computer-readable medium, such as a hard drive within or otherwise connected to the computing device 110.

Although the computing device 110 and the fax device 114 are shown as distinct devices in FIG. 1, this is merely an example and does not constitute a limitation of the present invention. Alternatively, for example, the conventional fax device 114 may be integrated into the computing device 110. For example, the fax device 114 may be implemented in a card that is installed within the computing device 110, and which may perform any of the functions disclosed herein as being performed by the fax device 114.

The IP fax client 112 transmits a request 118 to register the fax device 114 and/or the computing device 110 with the IP fax server 102a (FIG. 2, operation 202). Such a request may also be referred to herein as a request to create an account at the IP fax server 102a. The request 118 may, for example, be transmitted over a network (not shown), such as the public Internet or a private intranet. More generally, any of the transmissions of data disclosed herein may include transmitting data over a network, such as the public Internet or a private intranet.

The registration request 118 may include any of a variety of information, such as any one or more of the following: the conventional fax number 116 of the conventional fax device 114, an IP address of the computing device 110, a time of transmission of the request 118, and data identifying the user 108 (e.g., one or more of the user's real name, mailing address, telephone number, email address, and payment (e.g., credit card) information).

Figure 3:
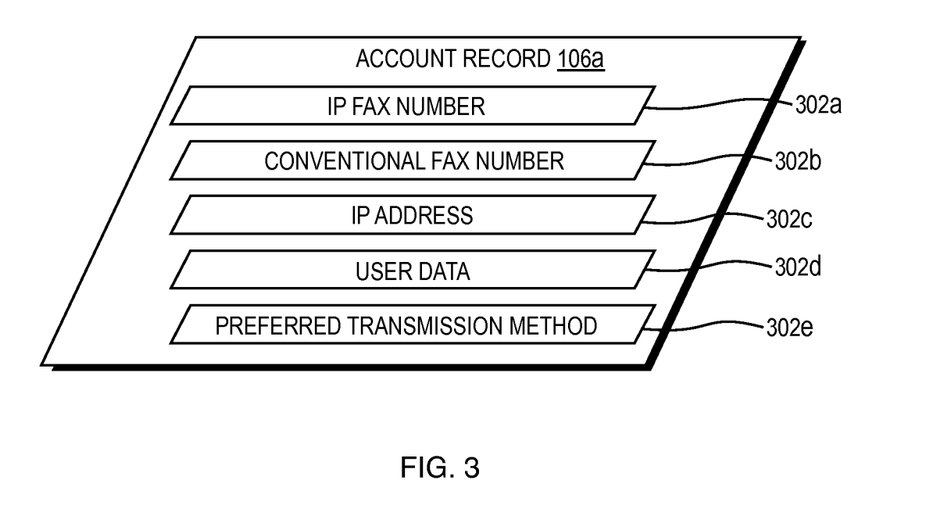
FIG. 3 is an illustration of a data structure that is used to store a user account record according to one embodiment of the present invention.

The IP fax server 102a receives the registration request 118 (FIG. 2, operation 204). In response to receiving the request 118, the IP fax server 102a creates a new account for the user 108 by creating a new account record for the user 108 in the account database 104a and storing account data for that account in the newly-created account record (FIG. 2, operation 206). Creating the account data record for the user 108 may include creating and storing any of a variety of information. For example, assuming that the account record 106a represents the account for user 108, FIG. 3 shows an example of data that may be stored by the IP fax server 102a in the account record 106a. In particular, the IP fax server 102a may:

create an IP fax number for the user 108 that is unique among all of the IP fax numbers stored in account records 106a-n in the account database 104a, and store the newly-created IP fax number in an IP fax number field 302a of the account record 106a (FIG. 2, operation 208a);

store the conventional fax number 116 of the conventional fax device 114 in a conventional fax number field 302b of the account record 106a (FIG. 2, operation 208b);

store the IP address of the computing device 110 in an IP address field 302c of the account record 106a (FIG. 2, operation 208c); and store user data representing the user 108 (such as one or more of the user's real name, mailing address, telephone number, email address, and payment (e.g., credit card) information) in a user data field 302d of the account record 106a (FIG. 2, operation 208d).

The unique IP fax number that is generated in operation 208a and stored in field 302a may take any of a variety of forms. For example, the unique IP fax number may take the form of a unique IP address (i.e., an IP address that is unique within the entire IP address space, not merely within the address space of the IP fax server 102a's local network). Such a unique IP address may, for example, be assigned within a particular domain. For example, if the IP fax server 102a assigns IP fax numbers within the domain ipfax.com, then examples of unique IP fax numbers that may be generated by the IP fax server in operation 208a include abc.ipfax.com and def.ipfax.com. These particular forms of IP fax numbers and particular methods for generating IP fax numbers are merely examples and do not constitute limitations of the present invention. More generally, an IP fax number may be any identifier that enables an IP fax client to be represented, addressed, and qualified as globally unique.

The IP fax server 102a may transmit some or all of the user 108's account record 106a to the IP fax client 112 in a response message 122 (FIG. 2, operation 210). The IP fax client 112 may receive the account data message 122 and store some or all of the record 106a locally. In particular, the IP fax client 112 may store the IP fax number 302a that the IP fax server 102a has assigned to the conventional fax device 114.

Although not shown in FIGS. 1 and 2, the system 100 of FIG. 1 may perform the method 200 of FIG. 2 for each of a plurality of users and the conventional fax devices and computing devices associated with those users, thereby creating and assigning a plurality of IP fax numbers to such fax devices and/or computing devices. As a result, the account database 104a may store, for each such account, a mapping between: (1) the IP fax number stored in field 302a of each account record; and (2) the conventional fax number stored in field 302b of the same account record. Such mapping data may also be stored locally at each of a plurality of IP fax clients.

Embodiments of the present invention may also be used to transmit messages to users using an appropriate transmission method. For example, embodiments of the present invention may enable messages to be transmitted to users via a plurality of transmission methods, examples of which include IP fax, conventional fax, secure document delivery, email, and text message. When the IP fax server 102a transmits a particular message to a particular user, the IP fax server 102a may select one or more of the plurality of transmission methods and then transmit the message to the particular user using the selected transmission method(s).

Figure 4:
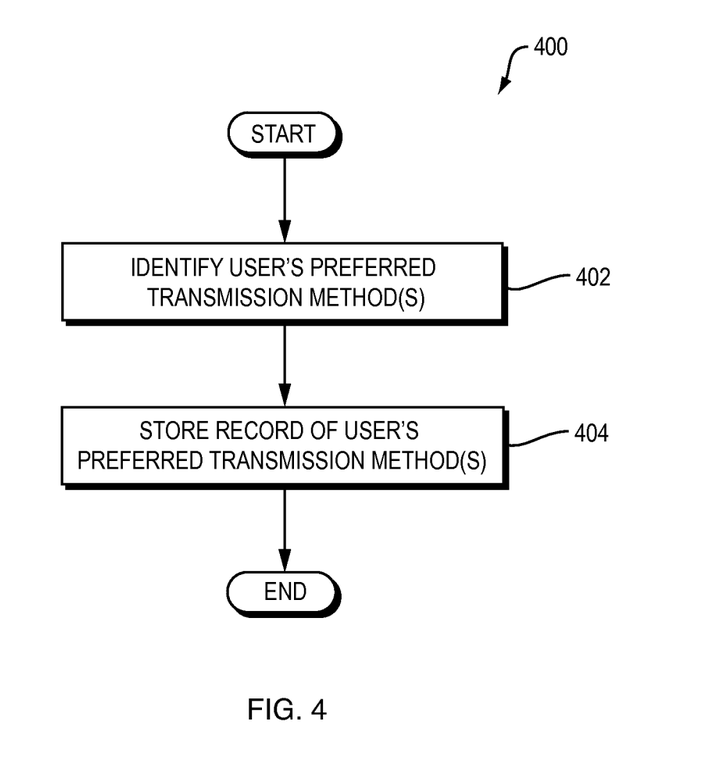
FIG. 4 is a flowchart of a method for identifying and storing a transmission method preferred by a user for transmitting an electronic package according to one embodiment of the present invention.

For example, referring to FIG. 4, a flowchart is shown of a method 400 for identifying and storing a preferred transmission method associated with a particular user. For purposes of example, assume that the method 400 is performed in connection with user 108. The method 400 may, however, be performed in connection with any number of users to identify and store preferred transmission methods for each such user. The preferred transmission methods for any two users may be the same as or differ from each other.

The IP fax server 102a identifies one or more preferred transmission methods for user 108 (FIG. 4, operation 402). The IP fax server 102a may identify the preferred transmission method(s) in any of a variety of ways. For example, as shown in FIG. 1, the user 108 may provide input 124, via the IP fax client 112, specifying the user 108's preferred transmission method(s). The user 108 may generate such input 124 by, for example, selecting a description of the user 108's preferred transmission method(s) from a list of available transmission methods (e.g., by selecting one or more of the following from a list: "IP Fax, "Conventional Fax," "Secure Document Delivery," "Email," and "Text Message").

As another example, the IP fax server 102a may identify the preferred transmission method(s) of the user 108 automatically in any of a variety of ways. For example, the IP fax server 102a may select a default transmission method (e.g., IP fax) as the preferred transmission method for the user 108. As another example, the IP fax server 102a may monitor a plurality of messages transmitted to and/or by the user 108 and identify the transmission method via which each such message is transmitted and/or received. The IP fax server 102a may identify the preferred transmission method(s) of the user 108 based on such data, such as by identifying the transmission method having the highest frequency of use as the user 108's preferred transmission method.

As yet another example, the IP fax server 102a may identify the user 108's preferred transmission method as the transmission method used most recently by the user 108 to transmit and/or receive a message. For example, each time the user 108 transmits a message, the IP fax server 102a may identify the transmission method via which the message is transmitted, and identify that transmission method as the user 108's preferred transmission method. Similarly, each time the user 108 receives a message, the IP fax server 102a may identify the transmission method via which the message is received, and identify that transmission method as the user 108's preferred transmission method.

Although the description of some of the examples above refer to the user 108's preferred transmission "method" in the singular, more generally the IP fax server 102a may identify one or more preferred transmission methods to associate with the user 108. Therefore, any reference herein to a preferred transmission "method" should be understood to refer to one or more preferred transmission methods.

The IP fax server 102a may identify a plurality of preferred transmission methods associated with the user 108 in any of a variety of ways. For example, the user 108 may manually specify some or all of a plurality of preferred transmission methods in the input 124, such as by selecting a plurality of descriptions of transmission methods via a graphical user interface. As another example, the IP fax server 102a may monitor a plurality of messages transmitted to and/or by the user 108 and identify some or all of the transmission methods via which such messages are transmitted and/or received. The IP fax server 102a may identify only transmission methods satisfying some criterion, such as transmission methods that have been used by the user 108 at least some predetermined number or percentage of times, and/or transmission methods that have been used recently by the user 108 (e.g., used by the user 108 no longer than some predetermined amount of time earlier than the current time, such as one week, one month, six months, or one year).

The IP fax server 102a may identify one or more preferred transmission methods for each of a plurality of document types. For example, the IP fax server 102a may identify a first preferred transmission method (e.g., fax) for text documents and a second preferred transmission method (e.g., secure document delivery) for image files. For example, the user 108 may manually specify one or more preferred transmission methods for each of a plurality of document types in the input 124. Examples of document types include text (e.g., word processing) documents, spreadsheets, Portable Document Format (PDF) files, image files (e.g., files in JPG, BMP, GIF, or PNG format), audio files, and multimedia files. The preferred transmission methods for any two document types may be the same as or differ from each other.

The IP fax server 102a may identify the user 108's preferred transmission method at any time(s), such as during the registration process disclosed above in connection with FIGS. 1 and 2, or after such a registration process has completed. For example, the IP fax server 102a may identify a preferred transmission method for the user 108 during the registration process, after which the user 108's preferred transmission method may be changed, either manually by the user 108 or automatically by the IP fax server 102a in any of the ways disclosed herein. As another example, the IP fax server 102a may not identify any preferred transmission method for the user 102a during the registration process, after which the user 108's preferred transmission method may be identified, either manually by the user 108 or automatically by the IP fax server 102a in any of the ways disclosed herein. The user 108's preferred transmission method may be identified, and therefore change, any number of times.

Regardless of how the user 108's preferred transmission method is identified, once it has been identified, the IP fax server 102a may store data representing the user 108's preferred transmission method in field 302e of user 108's account record 106a (FIG. 4, operation 404). Since the user 108's preferred transmission method may include one or more transmission methods, the preferred transmission method field 302e may include data representing one or more preferred transmission methods associated with user 108.

The set of a user's preferred transmission methods may be unordered or ordered. If a user's set of preferred transmission methods is ordered, then the ordering may be deterministic (i.e., each preferred transmission method may have a unique index) or non-deterministic (i.e., two or more preferred transmission methods may share the same index). The IP fax server 102a may store (e.g., as part of operation 404) data representing the ordering of a user's preferred transmission methods, such as by storing the index of each preferred transmission method in association with that preferred transmission method in field 302e of the user's account record.

If the preferred transmission methods of a user (e.g., user 108) are ordered, the IP fax server 102a may identify that order in any of a variety of ways. For example, the user 108 may provide input (e.g., within input 124) that specifies the ordering of some or all of the user 108's preferred transmission methods, such as by manually arranging descriptions of those preferred transmission methods in a particular sequence via a graphical user interface (GUI), or by inputting numbers (e.g., 1, 2, and 3) and assigning each of those numbers to one of the plurality of transmission methods to specify their order of preference. As another example, the IP fax server 102a may monitor a plurality of messages transmitted to and/or by the user 108, identify the transmission methods used to transmit (send and/or receive) those messages, and assign an ordering to those transmission methods that corresponds to the relative frequencies of use of the transmission methods. For example, the IP fax server 102a may assign the most-frequently used transmission method an index (order) of 1, the next most-frequently used transmission method an index (order) of 2, and so on.

As with any of the other data disclosed herein, data representing preferred transmission methods may be identified and stored by the IP fax server 102a in the account database 104a for one or more of a plurality of users. As a result, the account database 104a may include data representing preferred transmission methods associated with each of the plurality of users. The preferred transmission methods of any two users may be the same as or differ from each other.

Some or all of the system 100 of FIG. 1 may be located within a local network, such as a corporate intranet. For example, the IP fax server 102a, the computing device 110, and computing devices (not shown) of other users who access the IP fax server 102a may all be addressable at IP addresses within a particular local network. As a result, only the user 108 and other users having computing devices within the local network of the IP fax server 102a may communicate with the IP fax server 102a and, as a result, only such users may transmit IP faxes to the user 108 because the IP fax number of the user 108 is only accessible via the IP server 102a and the account database 104a that it maintains. In other words, in such an embodiment, users having computing devices located outside the local network of the IP fax server 102a may be unable to use the IP fax server 102a to transmit IP faxes to the user 108. More specifically, users of two different database instances (such as database instances 104a and 104b in FIG. 5) may be unable to transmit IP faxes to each other using the current state of the art, due to the lack of globally unique and publicly available identifiers (e.g., IP fax numbers) for such users.

Embodiments of the present invention may address this problem in a variety of ways to enable any user having a computing device connected to the public Internet to transmit IP faxes to users such as the user 108 who have IP fax numbers maintained by the IP fax server 102a. For example, referring to FIG. 5, a dataflow diagram is shown of a system 500 for enabling users connected to the public Internet, but not to the local network of the IP fax server 102a, to use the IP fax server 102a to transmit IP faxes to the user 108 and to other users of the IP fax server 102a (i.e., other users having account records in the account database 104a of the IP fax server 102a). Referring to FIG. 6, a flowchart is shown of a method 600 performed by the system 500 according to one embodiment of the present invention.

Figure 5:
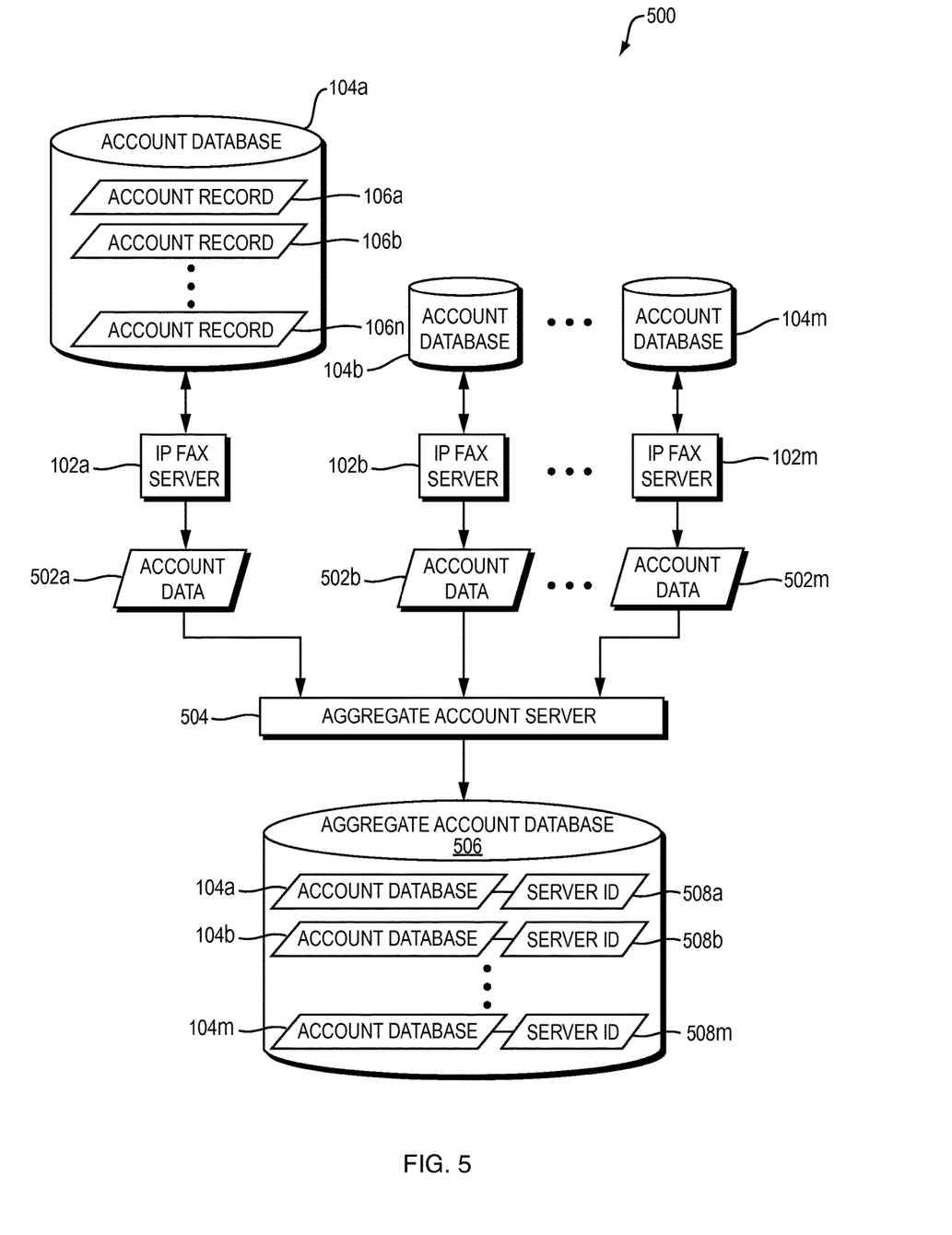
FIG. 5 is a dataflow diagram of a system for enabling user account data from multiple IP fax servers to be accessed via a single server according to one embodiment of the present invention.
Figure 6:
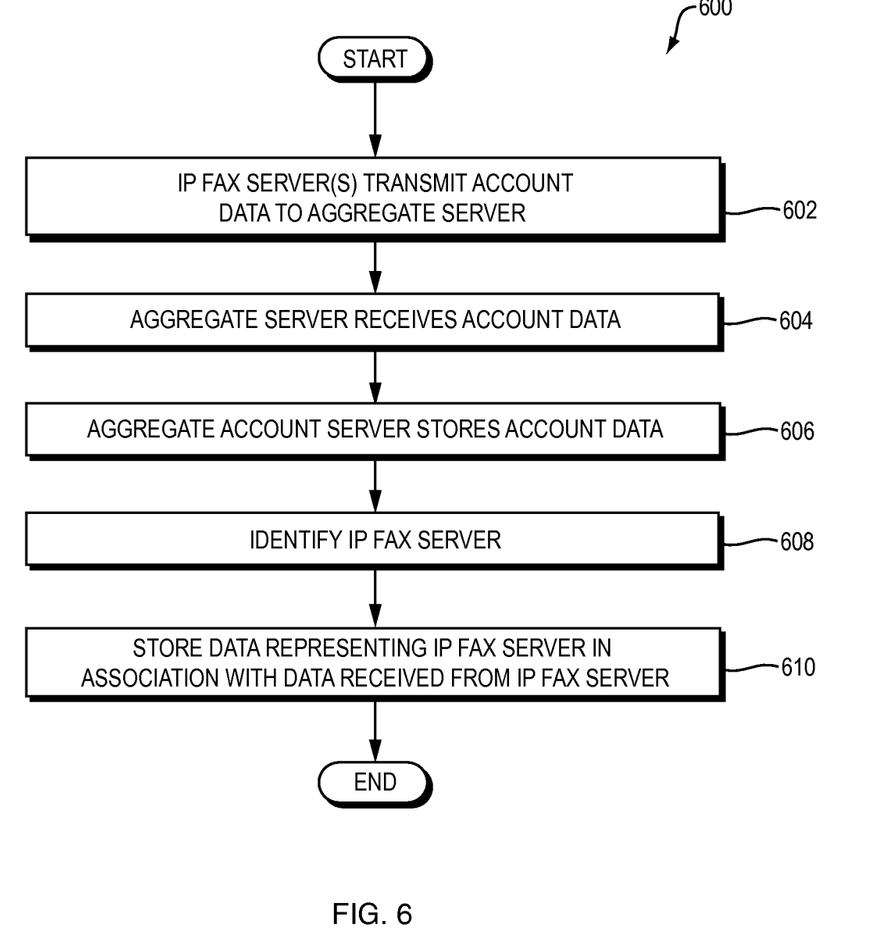
FIG. 6 is a flowchart of a method performed by the system of FIG. 5 according to one embodiment of the present invention.

The system 500 of FIG. 5 includes the IP fax server 102a and account database 104a of FIG. 1. The system 500 may also include any number of additional IP fax servers 102b-m and associated account databases 104b-m. Each such IP fax server and associated account database may operate in any of the ways disclosed herein for the IP fax server 102a and associated account database 104a. In particular, each such IP fax server and associated account database may operate within its own local network. For example, the IP fax server 102a and associated account database 104a may be addressable within a first local network, IP fax server 102b and associated account database 104b may be addressable within a second local network, and IP fax server 102m and associated account database 104m may be addressable with an mth local network.

The system 500 may include an aggregate account server 504. In general, the aggregate account server 504 may make account data (e.g., IP fax numbers) from one or more of the IP fax servers 102a-m accessible over the public Internet, so that users connected to the public Internet may transmit IP fax messages to users of one or more of the IP fax servers 102a-m, even if the transmitting user does not have access to the local network of the receiving user (e.g., even if the transmitting device of the transmitting user is not addressable within the same local network as the receiving device of the receiving user). For example, the aggregate account server 504 may make it possible for a transmitting user to transmit an IP fax message to a receiving user who is behind a firewall of a local network.

In particular, each of one or more of the IP fax servers 102a-m may transmit some or all of its associated account data 502a-m to aggregate account server 504 (FIG. 6, operation 602). The aggregate account server 504 may receive such account data (FIG. 6, operation 604). The aggregate account server 504 may store the received account data in an aggregate account database 506 (FIG. 6, operation 606). For example, FIG. 5 illustrates an example in which the entirety of account databases 104a, 104b, and 104m have been received and stored by the aggregate account server 504 in the aggregate account database 506.

When the aggregate account server 504 receives account data from one of the IP fax servers 102a-m, the aggregate account server 504 may identify the IP fax server that transmitted the account data (FIG. 6, operation 608). The aggregate account server 504 may store data representing the identity of the transmitting IP fax server in association with the account data received from that IP fax server (FIG. 6, operation 610). For example, FIG. 5 illustrates an example in which the aggregate account database 506 includes server identification data 508a identifying transmitting IP fax server 102a, server identification data 508b identifying transmitting IP fax server 102b, and server identification data 508m identifying transmitting IP fax server 102m.

The aggregate account server 504 need not store copies of data from the account databases 104a-m. Alternatively, for example, when the aggregate account server 504 receives a request to transmit a messages to a user of one of the IP fax servers 102a-m, the aggregate account server 504, in response to such a request, obtain data from one or more of the IP fax servers 102a-m as necessary to direct the message to the appropriate one of the IP fax servers 102a-m. The aggregate account server 504 may, in other words, receive account data or other data from the IP fax servers 102a-m on demand, instead of or in addition to storing copies of such data in the aggregate account database 506. For ease of illustration and explanation, however, the description below will reference the embodiment of FIG. 5, in which copies of the account databases 104a-m are stored in the aggregate account database 506.

The aggregate account server 504 and/or the aggregate account database 506 may be addressable over the public Internet. For example, the aggregate account server 504 may be accessible at a public IP address that is published and advertised in association with the aggregate account server 504. As a result, users having computing devices that are connected to the public Internet may use such computing devices to communicate with the aggregate account server 504 and/or the aggregate account database 506.

Figure 7:
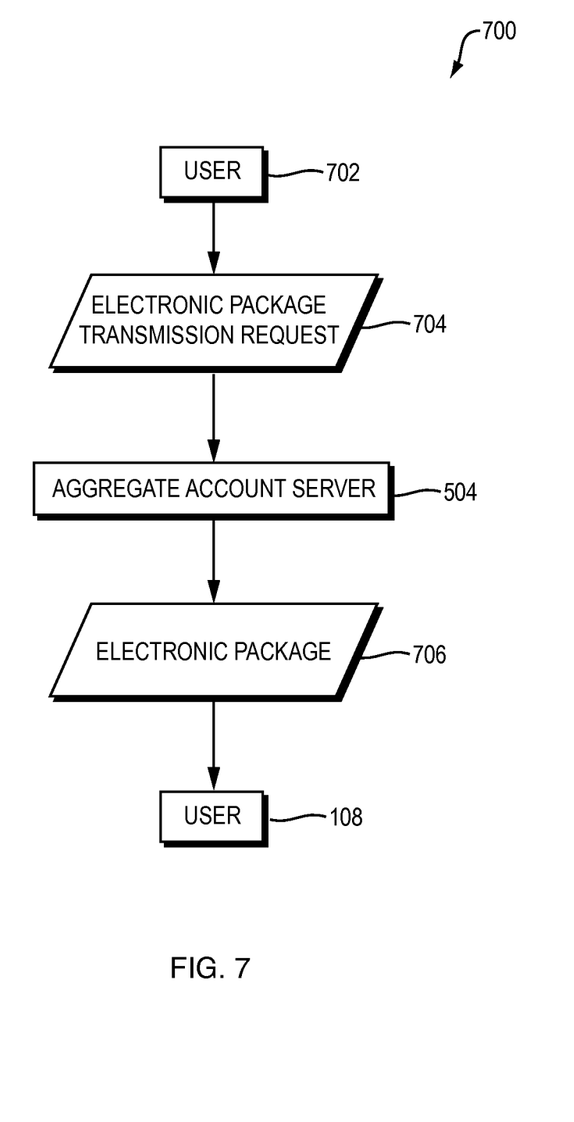
FIG. 7 is a dataflow diagram of a system for enabling users connected to the Internet to transmit IP faxes and other electronic packages to other users according to one embodiment of the present invention.
Figure 8:
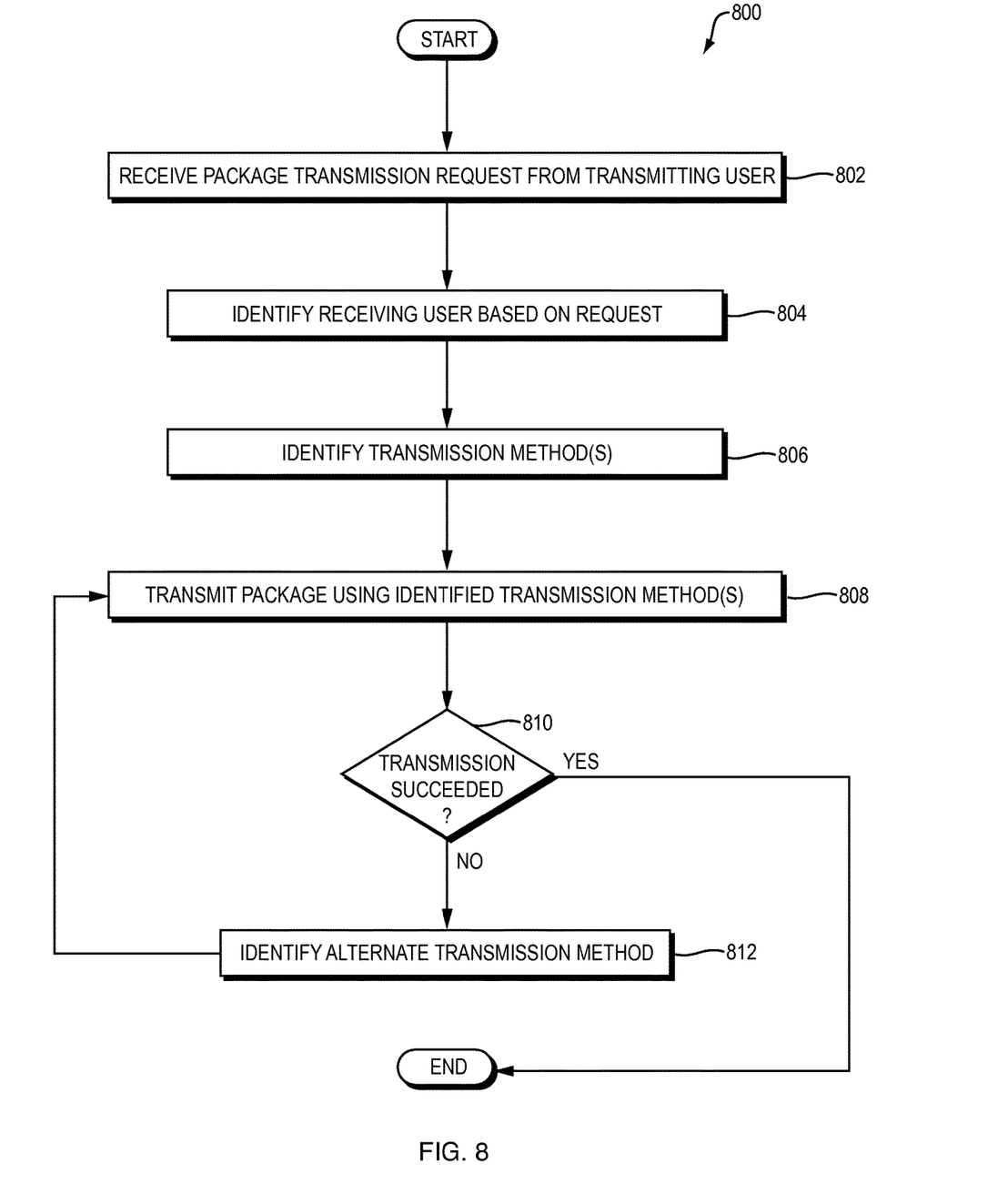
FIG. 8 is a flowchart of a method performed by the system of FIG. 7 according to one embodiment of the present invention.

In particular, referring to FIG. 7, a dataflow diagram is shown of a system 700 for using the aggregate account server 504 to enable users having computing devices connected to the public Internet to use those computing devices to transmit IP faxes, and other kinds of messages, to users of one or more of the IP fax servers 102*a*-*m* according to one embodiment of the present invention. Referring to FIG. 8, a flowchart is shown of a method 800 performed by the system 700 of FIG. 7 according to one embodiment of the present invention.

In the following discussion, the user who transmits a fax is referred to as the "transmitting user" and the user who receives the fax is referred to as the "receiving user." Referring to FIG. 7, a transmitting user 702 transmits, to the aggregate account server 504, a request 704 to transmit an electronic package to a receiving user. Assume for purposes of example that the receiving user is user 108 of FIG. 1. The aggregate account server 504 receives the request 704 (FIG. 8, operation 802).

In general, an electronic package may include any electronic data. For example, an electronic package may include any one or more of the following:

one or more files specified by the transmitting user 702, having any file type or combination of file types (such as word processing documents, spreadsheets, Adobe Portable Document Format (PDF) documents, audio files, video files, executable files, or compressed files (e.g., Zip files));

data derived from files specified by the transmitting user 702, such as compressed versions of files specified by the transmitting user 702 and/or data resulting from converting files specified by the transmitting user 702 into a different data format;

data identifying the transmitting user 702 (such as one or more of an IP fax number, conventional fax number, IP address, or email address associated with the transmitting user 702);

data identifying the receiving user 108 (such as one or more of an IP fax number, conventional fax number, IP address, or email address associated with the receiving user 108); and metadata, such as header data, which may include, for example, data representing the transmission time of the package, the transmission method of the package, and the data format of the package.

An electronic package is an example of a "message," as that term is used herein. Therefore, the following are all examples of electronic packages: IP fax messages, conventional fax messages, secure document delivery messages, email messages, and text messages. An electronic package may include any one or more of the foregoing types of messages.

The transmitting user 702 may generate the request 704 in any of a variety of ways. For example, the transmitting user 702 may generate the request 704 by:

scanning a paper document using a scanner that is connected to the transmitting user 702's computing device, and using that computing device to generate the request 704;

inserting a paper document into a conventional fax machine, dialing a conventional fax number of the receiving user 108, and hitting the "Send" button;

using an IP fax client installed on the transmitting user 702's computing device to generate an IP fax transmission request to transmit a document, such as a word processing document or an image file, via IP fax to an IP fax number of the receiving user 108;

transmitting an email message containing one or more attachments to a predetermined email address associated with the aggregate account server 504 and specifying an address (e.g., an email address) of the receiving user 108, thereby generating a request for the aggregate account server 504 to transmit an electronic package containing the attached document(s) to the receiving user 108; or using a locally-installed or web-based secure document delivery application to generate a request to transmit a package containing one or more documents via secure document delivery to the receiving user 108.

As mentioned above, the aggregate account server 504 may have an IP address that is accessible via the public Internet. The transmitting user 702 may transmit the request 704 to the aggregate account server 504 by addressing the aggregate account server 504 at such a publicly-accessible IP address. The transmitting user 702 may obtain such an IP address in any of a variety of ways, such as by searching for it via a search engine, or by transmitting the request 704 to the aggregate account server 504 using client software (not shown) that has the public IP address of the aggregate account server 504 embedded in it.

The request 704 may include any of a variety of data. For example, the request 704 may include data to include in a fax transmission to the receiving user 108, such as one or more files containing any combination of text and images (e.g., black-and-white and/or color images) in any format. Alternatively or additionally, the request 704 may include some or all of the data in the account record 106*a* of the receiving user 108. For example, the request 704 may include the IP fax number 302*a* of the receiving user 108. The transmitting user 702 may obtain the IP fax number 302*a* of the receiving user 108 in any of a variety of ways. For example, the aggregate account server 504 may publish a list of IP fax numbers stored in the aggregate account database 506, such as by publishing such a list on a searchable web site. Such a published list may include some or all of the data contained in the aggregate account database 506.

As another example, the transmitting user 702 may transmit a request (not shown) to the aggregate account server 504 for the receiving user 108's IP fax number, such as by transmitting the receiving user 108's conventional fax number, email address, real name, or any combination thereof, to the aggregate account server 504. In response to receiving such a request, the aggregate account server 504 may use the information provided by the transmitting user 702 as a query to search the aggregate account database 506 and thereby obtain the receiving user 108's IP fax number as a result of the search. The aggregate account server 504 may then transmit the IP fax number of the receiving user 108 to the transmitting user 702, who may then include the IP fax number of the receiving user 108 in the request 704 and in any subsequent requests to transmit faxes to the receiving user 108.

The aggregate account server 504 identifies the receiving user 108 based on the request 704 received from the transmitting user 702 (FIG. 8, operation 804). The aggregate account server 504 may identify the receiving user 108 in any of a variety of ways. For example, if the request 704 includes the IP fax number of the receiving user 108, the aggregate account server 504 may identify the receiving user 108 directly based on the IP fax number. As another example, if the request 704 includes other data associated with the receiving user 108, such as the receiving user 108's conventional fax number, email address, real name, or any combination thereof, the aggregate account server 504 may use such information as a query to search the aggregate account database 506 and thereby obtain the receiving user 108's IP fax number as a result of the search.

The aggregate account server 504 may identify one or more transmission methods to use to transmit the transmitting user 702's fax to the receiving user 108 (FIG. 8, operation 806). Note that operation 806 is optional. If operation 806 is omitted, for example, the aggregate account server 504 may transmit the transmitting user 702's fax to the receiving user 108 using a predetermined transmission method, such as IP fax.

The aggregate account server 504 may identify the transmission method(s) to use to transmit the transmitting user 702's fax to the receiving user 108 in any of a variety of ways. For example, the aggregate account server 504 may identify the receiving user 108's account record in the aggregate account database 506 and identify the transmission method(s) to use based on data in that account record. For example, if the receiving user 108's account record specifies a single preferred transmission method, then the aggregate account server 504 may identify that single preferred transmission method as the transmission method to use to transmit the transmitting user 702's fax to the receiving user 108. As another example, if the receiving user 108's account record specifies a plurality of ordered preferred transmission methods, then the aggregate account server 504 may select the first (i.e., highest-order) preferred transmission method.

As another example, the aggregate account server 504 may identify a transmission method via which the receiving user 108 currently is available to receive the fax from the transmitting user 702 as the transmission method to use to transmit the transmitting user 702's fax to the receiving user 108. For example, the aggregate account server 504 may determine whether the receiving user 108 is associated with a computing device (e.g., computing device 110) on which an IP fax client (e.g., IP fax client 112) is installed. If the receiving user is associated with such a computing device, then the aggregate account server 504 may determine whether the receiving user 108's IP fax client is online. The aggregate account server 504 may select "IP fax" as the transmission method for transmitting the transmitting user 702's fax to the receiving user 108 only if the receiving user 108 is associated with a computing device on which an IP fax client is installed and if that IP fax client is online. As another example, the aggregate account server 504 may determine whether the receiving user 108 is associated with a conventional fax device (e.g., conventional fax device 114) that is online and connected to a PSTN network, and select "conventional fax" as the transmission method for transmitting the transmitting user 702's fax to the receiving user 108 only if the receiving user 108 is determined to be associated with a conventional fax device that is determined to be online and connected to a PSTN network.

As yet another example, the aggregate account server 504 may identify a transmission method based on the type of document in the document electronic package 706. As mentioned above, the receiving user 108's account record 106*a* may contain data 302*e* representing a preferred transmission method for each of a plurality of document types. Therefore, the aggregate account server 504 may identify a type of document specified by the electronic package transmission request 704 and identify, based on the preferred transmission method data 302*e* and the identified type of document, the receiving user 108's preferred transmission method(s) for the identified type of document.

As yet another example, the request 704 received from the transmitting user 702 may specify one or more transmission methods to use to transmit the document package to the receiving user. The aggregate account server 504 may identify the transmission method(s) in operation 806 as the transmission method(s) specified by the transmitting user 702 in the request 704. Note, however, that the request 704 need not specify any transmission method to use to transmit the document package to the receiving user. In fact, one benefit of certain embodiments of the present invention is that they do not require the transmitting user 702 to specify which transmission method(s) to use to transmit the package to the receiving user 108, but instead may identify such transmission method(s) without input from the transmitting user 702.

The aggregate account server 504 transmits or attempts to transmit the transmitting user 702's electronic package 706 to the receiving user 108 via the identified transmission method(s) (FIG. 8, operation 808). The aggregate account server 504 may extract any data from the request 704 and/or generate data from the request 704 to generate the electronic package 706 that is transmitted to the receiving user 108. For example, the request 704 may include a message portion, in which case the aggregate account server 504 may extract the message portion from the request 704 and include the extracted message portion in the electronic package 706. The aggregate account server 504 may perform any appropriate processing on data extracted from the request 704 to generate data in the electronic package 706. For example, data from the request 704 may be formatted according to the protocol (e.g., IP fax, conventional fax, secure document delivery, email, or text message) that is used to transmit the electronic package 706.

If the aggregate account server 504 identified a plurality of transmission methods in operation 806, then the aggregate account server 504 may transmit multiple instances of the electronic package 706 contemporaneously using the plurality of identified transmission methods. For example, if the aggregate account server 504 identified a first preferred transmission method (e.g., IP fax) and a second preferred transmission method (e.g., email), then the aggregate account server 504 may transmit a first instance of the electronic package 706 to the receiving user 108 via the first preferred transmission method (e.g., IP fax), and transmit a second instance of the electronic package 706 to the receiving user 108 via the second preferred transmission method (e.g., email). The aggregate account server 504 may modify the instances of the electronic package 706 as necessary to conform to their respective transmission methods. As a result, the plurality of instances of the electronic package 706 may differ from each other in their format.

As described above, the aggregate account server 504 may identify the account record, in the aggregate account database 506, that is associated with the receiving user 108. The aggregate account server 504 may use such an account record in the process of transmitting the electronic package 706 to the receiving user 108. In particular, the aggregate account server 504 may identify, within the receiving user 108's account record, an address of the receiving user 108 that is associated with the transmission method that the aggregate account server 504 uses to transmit the electronic package 706 to the receiving user 108. For example:

- if the transmission method selected by the aggregate account server 504 is IP fax, then the aggregate account server 504 may identify the IP fax number 302*a* of the receiving user 108 and use the identified IP fax number 302*a* to transmit the electronic package 706 to the receiving user 108 via an IP fax protocol;
- if the transmission method selected by the aggregate account server 504 is conventional fax, then the aggregate account server 504 may identify the conventional fax number 302b of the receiving user 108 and use the identified conventional fax number 302b to transmit the electronic package 706 to the receiving user 108 via a conventional fax protocol;

if the transmission method selected by the aggregate account server 504 is email, then the aggregate account server 504 may identify the email address of the receiving user 108 in the user data 302d and use the identified email address to transmit the electronic package 706 to the receiving user 108 via an email protocol; and if the transmission method selected by the aggregate account server 504 is secure document delivery, then the aggregate account server 504 may identify the secure document delivery address of the receiving user 108 in the user data 302d and use the identified secure document delivery address to transmit the electronic package 706 to the receiving user 108 via a secure document delivery protocol.

The receiving user 108 may receive the electronic package 706 in any of a variety of ways. For example:

if the electronic package 706 is transmitted to the receiving user 108 via IP fax, then the receiving user 108's IP fax client 112 may receive the incoming electronic package 706 as an IP fax on behalf of the receiving user 108;

if the electronic package 706 is transmitted to the receiving user 108 via conventional fax, then the receiving user 108's conventional fax device 114 may receive the incoming electronic package 706 as a conventional fax on behalf of the receiving user 108;

if the electronic package 706 is transmitted to the receiving user 108 via email, then an email client (not shown) on the receiving user 108's computing device 110 may receive the incoming electronic package 706 as an email message on behalf of the receiving user 108; and if the electronic package 706 is transmitted to the receiving user 108 via secure document delivery, then a secure document delivery client (not shown) on the receiving user 108's computing device 110 may receive the incoming electronic package 706 as a secure document delivery package on behalf of the receiving user 108.

The aggregate account server 504 determines whether transmission of the electronic package 706 succeeded, i.e., whether the electronic package 706 reached the user 108 (e.g., the user 108's computing device 110) (FIG. 8, operation 810). The aggregate account server 504 may determine whether transmission of the electronic package 706 succeeded in any of a variety of ways. In general, the aggregate account server 504 may use any means associated with the transmission method (e.g., protocol) that was used to transmit the electronic package 706 to determine whether transmission of the electronic package 706 succeeded. For example, if the electronic package 706 is transmitted via conventional fax, the aggregate account server 504 may use conventional means to determine whether all pages of the fax transmitted successfully without errors. As another example, if the electronic package 706 is transmitted via email, the aggregate account server 504 may use conventional means to determine whether the email message containing the electronic package 706 bounced back to the sender.

If transmission of the electronic package 706 succeeded, then method 800 terminates. If transmission of the electronic package 706 did not succeed, then the aggregate account server 504 may identify an alternate transmission method 812, i.e., a transmission method other than the transmission method previously identified in operation 806 and used to transmit the electronic package 706 in operation 808. The aggregate account server 504 may then attempt to transmit the electronic package 706 using the newly-selected transmission method (FIG. 8, operation 808). The aggregate account server 504 may continue such attempts, and select new transmission methods, until the electronic package 706 succeeds.

The aggregate account server 504 may identify the alternate transmission method in operation 812 in any of a variety of ways. For example, if the receiving user 108's preferred transmission method 302e specifies a plurality of transmission methods, and a first one of the plurality of transmission methods was identified in operation 806 and used to transmit the electronic package 706 in operation 808, then the aggregate account server 504 may select a second one of the plurality of transmission methods in operation 812. As a particular example, if the receiving user 108's preferred transmission method 302e specifies a plurality of ordered transmission methods, and the highest-order transmission method was identified in operation 806 and used to transmit the electronic package 706 in operation 808, then the aggregate account server 504 may select the second highest-order transmission method in operation 812. In this way, the aggregate account server may select the receiving user 108's preferred transmission methods in descending order until one of the receiving user 108's preferred transmission methods succeeds.

Embodiments of the present invention have a variety of advantages, such as the following. One advantage of embodiments of the present invention is that they enable anyone having access to a computing device that is connected to the public Internet to transmit high-quality faxes (such as high-definition color faxes using Biscom's HD-IP Fax technology) to other users, even if such other users receive such faxes using fax clients that are behind a firewall in a private network, such as a corporate LAN. By using a publicly-accessible server in conjunction with a public registry of IP fax numbers, embodiments of the present invention increase the reach of IP fax to extend to the entire public Internet.

One benefit of enabling any user to transmit IP faxes to other users is that IP faxes can be transmitted at much higher speeds than conventional faxes, because IP faxes can be transmitted over any IP network medium, not merely over PSTN telephone lines. In particular, either the transmitting user 702's request 704, the resulting electronic package 706, or both may be transmitted via IP. Even if only the request 704, or only the electronic package 706, is transmitted via IP, a gain in speed is obtained in comparison to the alternative of transmitting the entire transmission via conventional fax. In cases in which both the request 704 and the electronic package 706 are transmitted via IP, the entire transmission (consisting of both the request 704 and the electronic package 706) may be transmitted via IP, thereby enabling the entire transmission to benefit from the increased speed of IP transmission.

Another benefit of embodiments of the present invention is that they enable gains in speed to be obtained even if both the transmitting user 702 and the receiving user 108 do not have access to IP fax transmission mechanisms. For example:

if the transmitting user 702 only has access to conventional fax transmission mechanisms but the receiving user 108 has access to IP fax transmission mechanisms, the user 702 may transmit the request 704 via conventional fax, while the aggregate account server 504 may transmit the electronic package 706 to the user 108 via IP fax, thereby obtaining a gain in speed compared to a transmission performed entirely via conventional fax; and if the transmitting user 702 has access to IP fax transmission mechanisms but the receiving user 108 only has access to conventional fax transmission mechanisms, the user 702 may transmit the request 704 via IP fax, while the aggregate account server 504 may transmit the electronic package 706 to the user 108 via conventional fax, thereby obtaining a gain in speed compared to a transmission performed entirely via conventional fax.

More generally, embodiments of the present invention provide increased flexibility in combining the transmission mechanisms that are available to the transmitting user 702 and the receiving user 108 to achieve a transmission from the transmitting user 702 to the receiving user 108. The aggregate account server 504 may receive the request 704 from the transmitting user 702 via any transmission method (e.g., conventional fax, IP fax, secure document delivery, email, text message) and transmit the electronic package 706 to the receiving user 108 via any transmission method (e.g., conventional fax, IP fax, secure document delivery, email, text message) in any combination, whereby the transmission method that is used to receive the request 704 may be the same as or differ from the transmission method that is used to transmit the electronic package 706.

Another advantage of embodiments of the present invention is that, by enabling the use of IP fax, including Biscom's HD-IPFax, they enable faxes to be transmitted in color and at higher resolutions than conventional faxes. For example, Biscom's HD-IPFax has no theoretical maximum resolution and may, for example, be used to transmit IP faxes at resolutions of 300 dots per inch (dpi), 600 dpi, 1200 dpi, 2400 dpi, and higher. As a result, embodiments of the present invention may enable faxes to be transmitted over the public Internet in ways that are useful for transmitting medical images and other documents that require color and/or high resolution. In practice, users may select a resolution that provides an acceptable tradeoff between image quality and transmission speed.

Yet another advantage of embodiments of the present invention is that they enable different transmission methods to be used to transmit documents to users. For example, embodiments of the present invention enable a preferred transmission method to be associated with a user (such as a transmission method specified manually by the user), and for documents to be transmitted to the user using the user's preferred transmission method. This feature of embodiments of the present invention enable users to receive documents using transmission methods that are most useful and/or convenient to them.

A related advantage of embodiments of the present invention is that they may be used to attempt to transmit documents to users using alternative transmission methods in the event that the initial attempted transmission method fails. Such techniques combine the benefits of enabling users to receive documents using their preferred transmission methods with the flexibility to use alternative transmission methods in the event that the preferred (or most-preferred) transmission methods fail.

Yet another benefit of embodiments of the present invention is that they take advantage of the general benefits of fax communication. One such benefit is that fax transmissions are easy and quick to initiate, merely requiring the transmitting user to insert a document into a fax machine, enter a destination address (e.g., conventional fax number), and hit a send button, thereby obviating the need to run software on a computer or even have access to a computer. Another benefit of fax transmissions is that faxes are received and printed immediately and automatically at the receiving end, thereby obviating the need for the receiving user to check an inbox or manually print incoming faxes. Embodiments of the present invention enable both transmitting users and receiving users to retain these benefits of conventional faxes, while supplementing those benefits with the advantages disclosed herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The term "IP fax" includes any transmission method (e.g., protocol) that may be used to transmit faxes using Internet Protocol (IP), in whole or in part. For example, the term "IP fax" as used herein encompasses transmission methods which are capable of transmitting faxes without using any conventional fax protocol at any point in the transmission. For example, the term "IP fax" as used herein encompasses transmission methods which are capable of transmitting faxes solely using IP from end-to-end, i.e., at all points from the transmitting user to the receiving user, such as Biscom's HD-IP Fax protocol. In other words, the term "IP fax," as used herein, includes, but is not limited to, Biscom's HD-IP fax. The term "IP fax" as used herein, for example, also includes transmission methods which include a combination of conventional fax protocols and IP to transmit a fax, such as Fax over IP (FOIP). For example, the term "IP fax" as used herein encompasses the transmission of a fax which involves the use of IP to transmit the fax from the transmitting user 702's computing device to the aggregate account server 504, and the use of a conventional fax protocol to transmit the fax from the aggregate account server 504 to the receiving user 108's computing device. The term "IP fax" as used herein also encompasses the transmission of a fax which solely involves the use of IP to transmit the fax from the transmitting user 702's computing device to the aggregate account server 504 and to transmit the fax from the aggregate account server 504 to the receiving user 108's computing device.

Certain techniques are disclosed herein in connection with user accounts. For example, in certain embodiments disclosed herein, a user account record may specify an ordered set of transmission methods, in descending order of preference by the user. As another example, in certain embodiments disclosed herein, a user account record may specify a distinct preferred transmission method for each of a plurality of document types. Any such techniques may, additionally or alternatively, be applied to multiple user accounts, e.g., on a system-wide basis to all user accounts. For example, the aggregate account server 504 may store data representing an ordered set of transmission methods, and apply that ordered set of transmission methods to some or all receiving users.

Such an ordered set may be configurable by an administrator of the aggregate account server 504, but not by other users.

Certain functions disclosed herein as being performed by the aggregate account server 504 may additionally or alternatively be performed by one or more of the IP fax servers 102a-m. For example, any one or more of the IP fax servers 102a-m may perform the method 800 of FIG. 8 to transmit an electronic package according to any of a plurality of transmission methods. Therefore, more generally the IP fax servers 102a-m may be electronic package servers which include means for transmitting not only IP faxes but also for transmitting electronic packages using other transmission methods, such as conventional fax, secure document delivery, email, and text message. The IP fax servers 102a-m may perform such functions only within their own local networks, or across the public Internet.

Furthermore, the functions described herein as being performed by the aggregate account server 504 may be divided in any of a variety of ways between the aggregate account server 504 and one or more of the IP fax servers 102a-m. For example, the aggregate account server 504 and aggregate account database 506 may be addressable over the public Internet and act as a global address registry. For example, the aggregate account database 506 may include mappings between IP fax numbers and conventional fax numbers. When a user of one of the IP fax servers 102a-m transmits the electronic package transmission request 704 to that IP fax server, the IP fax server may query the aggregate account server 504 for information about the destination (e.g., receiving user 108) of the request 704, such as by providing the aggregate account database 506 with information in the request 704 that identifies the receiving user 108 of the request (such as the receiving user 108's conventional fax number), in response to which the aggregate account server 504 may provide the IP fax server with information about the receiving user 108 that is mapped to the request information in the aggregate account database 506, such as the receiving user 108's IP fax number. The IP fax server may then use the information received from the aggregate account server 504 to transmit the electronic package 706 to the receiving user 108. In such an embodiment, the aggregate account server 504 acts as an address registry that is available to the plurality of IP servers 102a-m over the public Internet, while the IP servers 102a-m perform the function of transmitting electronic packages from one user to another.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor, the method comprising:
   (A) receiving, at a server over the Internet, a request to transmit an electronic package from a device of a transmitting user to a device of a receiving user, wherein the request is addressed to an address of the server on the Internet, wherein the address of the server is outside a local network of the device of the transmitting user;
   (B) at the server, identifying an Internet Protocol (IP) fax address of the receiving user based on data in the request; and
   (C) at the server, transmitting the electronic package to the device of the receiving user over the Internet only via an IP fax protocol at the identified IP fax address, wherein the identified IP fax address is outside a local network of the server, comprising transmitting the electronic package to the device of the receiving user at an IP address that is behind a firewall of a local network to which the device of the receiving user is connected; and wherein (C) comprises:
   (C)(1) attempting to transmit the electronic package to the device of the receiving user via a transmission method other than IP fax, wherein the transmission method other than IP fax is one of conventional fax, secure document delivery, email, and text message;

(C)(2) determining that the attempt to transmit the electronic package to the device of the receiving user failed; and (C)(3) in response to the determination in (C)(2), transmitting the electronic package to the device of the receiving user via the IP fax protocol at the identified IP fax number.

2. The method of claim 1, wherein (B) comprises: (B)(1) identifying a conventional fax number of the receiving user in the request; (B)(2) identifying a mapping of the conventional fax number of the receiving user to the IP fax address of the receiving user; and (B)(3) identifying the IP fax address of the receiving user based on the mapping.

3. The method of claim 2, further comprising: (D) before (B): (D)(1) generating the mapping; and (D)(2) storing data representing the mapping; and wherein (B)(2) comprising identifying the mapping based on the data representing the mapping.

4. The method of claim 1, wherein (C) comprises: (C)(1) identifying data representing a preferred transmission method associated with the receiving user; and (C)(2) determining that the data representing the preferred transmission method associated with the receiving user specifies an IP fax transmission method.

5. The method of claim 1, further comprising: (D) determining that the transmission of the electronic package to the device of the receiving user failed; (E) in response to the determination in (D): (E)(1) selecting an alternate transmission method, wherein the alternate transmission method is one of conventional fax, secure document delivery, email, and text message; and (E)(2) transmitting the electronic package to the device of the receiving user via the alternate transmission method.

6. The method of claim 1, wherein (C) further comprises transmitting the electronic package to the device of the receiving user via a protocol other than the IP fax protocol, wherein the protocol other than the IP fax protocol is one of a conventional fax protocol, a secure document delivery protocol, an email protocol, and a text message protocol.

7. A system comprising at least one non-transitory computer-readable medium containing computer program instructions, wherein the computer program instructions are executable by at least one computer processor to perform a method, the method comprising:

(A) receiving, at a server over the Internet, a request to transmit an electronic package from a device of a transmitting user to a device of a receiving user, wherein the request is addressed to an address of the server on the Internet, wherein the address of the server is outside a local network of the device of the transmitting user;

(B) at the server, identifying an Internet Protocol (IP) fax address of the receiving user based on data in the request; and (C) at the server, transmitting the electronic package to the device of the receiving user over the Internet only via an IP fax protocol at the identified IP fax address, wherein the identified IP fax address is outside a local network of the server, comprising transmitting the electronic package to the device of the receiving user at an IP address that is behind a firewall of a local network to which the device of the receiving user is connected; wherein (C) comprises:

(C)(1) attempting to transmit the electronic package to the device of the receiving user via a transmission method other than IP fax, wherein the transmission method other than IP fax is one of conventional fax, secure document delivery, email, and text message;

(C)(2) determining that the attempt to transmit the electronic package to the device of the receiving user failed; and (C)(3) in response to the determination in (C)(2), transmitting the electronic package to the device of the receiving user via the IP fax protocol at the identified IP fax number.

8. The system of claim 7, wherein (B) comprises: (B)(1) identifying a conventional fax number of the receiving user in the request; (B)(2) identifying a mapping of the conventional fax number of the receiving user to the IP fax address of the receiving user; and (B)(3) identifying the IP fax address of the receiving user based on the mapping.

9. The system of claim 8, further comprising: (D) before (B): (D)(1) generating the mapping; and (D)(2) storing data representing the mapping; and wherein (B)(2) comprising identifying the mapping based on the data representing the mapping.

10. The system of claim 7, wherein (C) comprises: (C)(1) identifying data representing a preferred transmission method associated with the receiving user; and (C)(2) determining that the data representing the preferred transmission method associated with the receiving user specifies an IP fax transmission method.

11. The system of claim 7, further comprising: (D) determining that the transmission of the electronic package to the device of the receiving user failed; (E) in response to the determination in (D): (E)(1) selecting an alternate transmission method, wherein the alternate transmission method is one of conventional fax, secure document delivery, email, and text message; and (E)(2) transmitting the electronic package to the device of the receiving user via the alternate transmission method.

12. The system of claim 7, wherein (C) further comprises transmitting the electronic package to the device of the receiving user via a protocol other than the IP fax protocol, wherein the protocol other than the IP fax protocol is one of a conventional fax protocol, a secure document delivery protocol, an email protocol, and a text message protocol.

* * * * *

UNITED STATES PATENT AND TRADEMARK OFFICE
CERTIFICATE OF CORRECTION

PATENT NO. : 9,794,427 B2
APPLICATION NO. : 14/877493
DATED : October 17, 2017
INVENTOR(S) : Ho et al.

It is certified that error appears in the above-identified patent and that said Letters Patent is hereby corrected as shown below:

On the Title Page

Item (72), under "Inventors", in Column 1, Line 2, delete "Arlington, VA (US)" and insert -- Arlington, MA (US) --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*